Aug. 31, 1954
E. ONOSKO
2,687,872
SANITARY VALVE
Filed Sept. 18, 1952
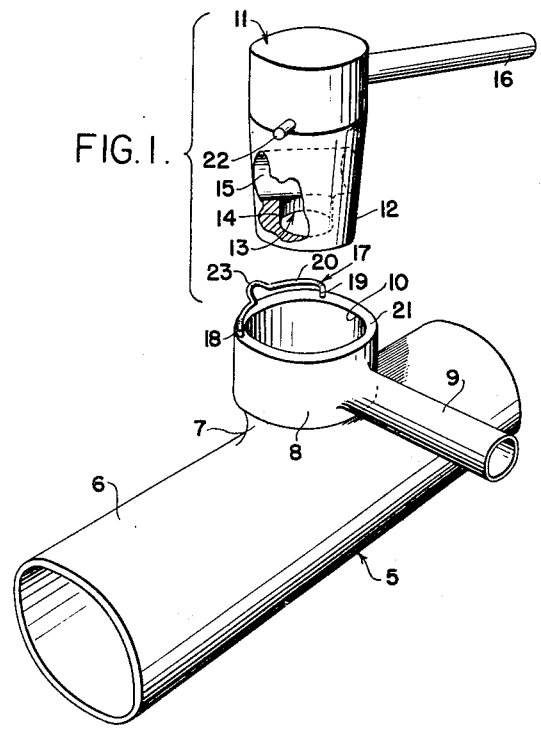
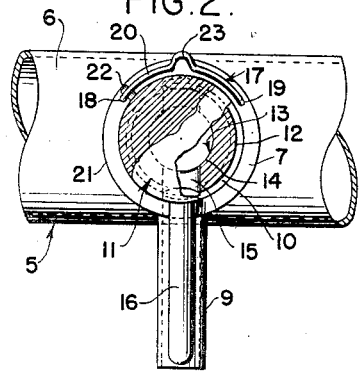
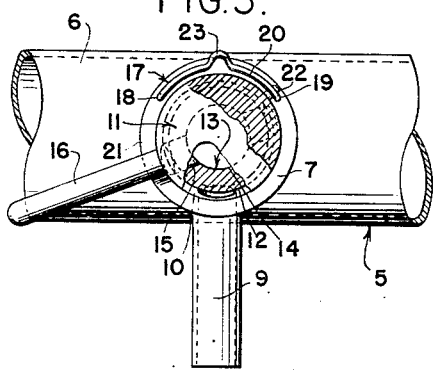
INVENTOR.
Edward Onosko
BY
ATTORNEYS Patented Aug. 31, 1954

2,687,872

UNITED STATES PATENT OFFICE 2,687,872

SANITARY VALVE

Edward Onosko, Kenosha, Wis., assignor to Tri-Clover Machine Co., Kenosha, Wis., a corporation of Wisconsin Application September 18, 1952, Serial No. 310,240

2 Claims. (Cl. 251—287)

This invention relates to improvements in sanitary valves.

In certain sanitary piping systems, such as line milking systems for barns, there is need for a T-type reducing valve to which the flexible hose of a milking machine can be removably connected. The valves which have heretofore been used for this purpose have been plug valves welded to the branch line of a reducing T. These have been unsatisfactory because of the fact that a relatively long neck projecting from the main line is necessary to properly connect the valve to the branch line. Furthermore, in these prior valves it is necessary that this neck have an internal diameter of not less than ¾", so that it can be properly inspected after cleaning. These prior valves have been relatively expensive to manufacture and are difficult to clean.

It is a general object of the present invention to provide an improved sanitary valve which is compact and which is so constructed that it can be quickly and easily disassembled and cleaned.

A more specific object of the invention is to provide an improved valve of the class described, said valve including a tubular body having a right angular extension and having a plug valve rotatable coaxially within said extension, and there being a tubular connecting member of reduced diameter projecting radially from said first extension and adapted to have a flexible hose connected thereto.

Another object of the invention is to provide an improved valve of the class described having novel means normally retaining the plug valve in said valve body, said means permitting removal of the plug valve from the valve body when said valve is moved to a predetermined intermediate position.

Another specific object of the invention is to provide an improved valve of the class described wherein the locking means also serves as a stop normally limiting the amount of rotational movement of the plug valve between open and closed positions.

A further object of the invention is to provide an improved valve of the class described which is easily manufactured in a small number of component parts and which is particularly well adapted for use in sanitary piping systems.

With the above and other objects in view, the invention consists of the improved sanitary valve, and all of its parts and combinations, as set forth in the claims, and all equivalents thereof.

In the drawing accompanying and forming a part of this specification, wherein one complete embodiment of the preferred form of the invention is shown, and wherein like characters of reference indicate the same parts in all of the views:

Fig. 1 is an exploded perspective view of the improved sanitary valve, showing the plug valve removed from the valve body;

Fig. 2 is a plan view of the improved valve, partly in section, showing the plug valve in open position; and Fig. 3 is view similar to Fig. 2, showing the plug valve rotated to closed position.

Referring more particularly to the drawing, the numeral 5 indicates a tubular fitting forming a valve body and having a tubular main line section 6 and a right angularly disposed tubular extension preferably of small diameter. The line 7 may have an end portion 8 (Fig. 1) of increased wall thickness. The extension 7 has a tubular connection number 9 of reduced diameter projecting radially therefrom, preferably at a right angle with respect to the main line section 6. The connection member 9 opens into the interior of extension 7, as shown in Figs. 2 and 3.

The extension 7 has a tapered internal surface 10 forming a valve seat. A generally cylindrical plug valve 11 has a tapered surface portion 12. The plug 11 is normally positioned in extension 7 with its tapered surface 12 sealingly engaging the tapered seat 10. Plug valve 11 is formed with a T-shaped bore or passage 13 having an axial extent 14 and having a diametric extent 15, the axis of the latter normally being in substantially the same radial plane as the axis of the connection member 9. A handle 16 projects radially from plug 11 in line with extent 15 of bore 13, said handle projecting from a portion of plug 11 beyond the end wall 21 of extension 7.

Fixed to the annular end wall 21 of extension 7 is a generally U-shaped retaining and stop member 17, having a pair of spaced parallel arms 18 and 19 connected by an arcuate intermediate extent 20. The arms 18 and 19 extend axially of extension 7, and the intermediate extent 20 is spaced from and is parallel with the circular end wall 21. A pin 22 projects radially from the plug valve 11 and is normally slidably positioned between the extent 20 of member 17 and annular end wall 21.

The pin 22 and member 17 are so related that when plug valve member 11 is in the open position of Fig. 2 where extent 15 of bore 13 communicates with connection member 9, the pin 22 abuts arm 18 of member 20. When plug valve member 11 is rotated to the closed position of Fig. 3 where the extent 15 of bore 13 is out of communication with connection number 9, the pin 22 abuts arm 19 of member 17. Member 17 normally prevents axial movement of plug valve 11 off of its seat 10. However, to permit removal of the plug 11 for cleaning, the intermediate extent 20 of member 17 is formed with a radially outwardly offset or U-shaped portion 23. Portion 23 permits the passage of pin 22 therethrough and permits axial outward movement of plug 11 when the latter is in an intermediate position (not shown) where pin 22 registers with offset 23.

The improved sanitary valve is adapted to form a part of a barn milking system line, the main line section 6 being optionally made integral with the line or provided with sanitary detachable coupling means of any well known type (not shown) for connection with said line. The tubular connection member 9 is adapted to have a hose from a milking apparatus removably connected thereto.

It is apparent that when valve 11 is in the open position of Fig. 2 it affords communication between the tubular connection 9 and the main line section 6 of body 5. When the valve member 11 is in the closed position of Fig. 3, tubular connection 9 is shut off from the main line section 6. While the valve member 11 is normally held against axial movement by pin 22 and member 20, said valve member can be readily removed for cleaning by rotation to the intermediate position where the pin 22 registers with the offset portion 23 of member 20.

Various changes and modifications may be made without departing from the spirit of the invention, and all of such changes are contemplated as may come within the scope of the claims.

What I claim is:

1. In a sanitary valve, a valve body having an open end and having an annular surface at said open end and having a discharge outlet in a side of said body, a plug valve coaxially rotatably positioned in said body and projecting from the open end thereof, said plug valve having an inner end provided with a passage which extends between said inner end and a side wall and which is positioned to register with said discharge outlet in the valve body when the plug valve is in a predetermined position of rotation, a pin projecting radially from a portion of said plug valve at the open end of the valve body outwardly of said annular surface, and a wire stop member having a main portion which lies in a plane substantially parallel to but spaced outwardly from the plane of said annular surface and having downturned ends fixed to said valve body, said ends being positioned to be engaged by said pin when said plug valve is in closed and open positions respectively to prevent rotation of said valve member beyond said positions, and said pin being positioned between said main portion of the stop member and the annular surface of the valve body so that outward axial movement of said plug valve is normally prevented.

2. In a sanitary valve, a valve body having an open end and having an annular surface at said open end and having a discharge outlet in a side of said body, a plug valve coaxially rotatably positioned in said body and projecting from the open end thereof, said plug valve having an inner end provided with a passage which extends between said inner end and a side wall and which is positioned to register with said discharge outlet in the valve body when the plug valve is in a predetermined position of rotation, a pin projecting radially from a portion of said plug valve at the open end of the valve body and outwardly of said annular surface, and a wire stop member having a main portion which lies in a plane substantially parallel to but spaced outwardly from the plane of said annular surface and having downturned ends fixed to said valve body, said ends being positioned to be engaged by said pin when said plug valve is in closed and open positions respectively to prevent rotation of said valve member beyond said positions, and said main portion of the wire stop member being positioned over said pin to normally prevent outward axial movement of said plug valve, an intermediate part of said main portion having a laterally outwardly extending U-bend of such size as to permit movement of the pin therethrough when the pin is in registration with said bend to permit disassembly of said plug by outward axial movement.

References Cited in the file of this patent

UNITED STATES PATENTS

| Number | Name | Date |
| --- | --- | --- |
| 166,581 | Barnes | Aug. 10, 1875 |
| 1,333,461 | Babson | Mar. 9, 1920 |
| 1,634,771 | Card | July 5, 1927 |
| 1,789,500 | Schmidt | Jan. 20, 1931 |